United States Patent
Gersak

(10) Patent No.: US 6,725,554 B1
(45) Date of Patent: Apr. 27, 2004

(54) ELECTRONIC SPIRIT LEVEL FOR MEASUREMENT OF INCLINATION-EXECUTION OF ELECTRIC RESISTORS AND CONDUCTORS

(75) Inventor: Boris Gersak, 516 Nelson St., Rockville, MD (US) 20850

(73) Assignee: Boris Gersak, Arlington, VA (US)

( * ) Notice: Subject to any disclaimer, the term of this patent is extended or adjusted under 35 U.S.C. 154(b) by 0 days.

(21) Appl. No.: 09/821,462

(22) PCT Filed: Jul. 26, 2000

(86) PCT No.: PCT/SI00/00018

§ 371 (c)(1),
(2), (4) Date: Apr. 9, 2001

(87) PCT Pub. No.: WO01/13061

PCT Pub. Date: Feb. 22, 2001

(30) Foreign Application Priority Data

Aug. 13, 1999 (SI) ............................................. P-9900196

(51) Int. Cl.⁷ ................................................. G01C 9/06
(52) U.S. Cl. .................................. 33/366.15; 33/366.11
(58) Field of Search ........................ 33/366.15, 366.11, 33/366.12, 366.14, 366.18, 366.19, 366.21, 366.22, 366.25, 366.26

(56) References Cited

U.S. PATENT DOCUMENTS

| | | | | |
|---|---|---|---|---|
| 2,635,349 A | * | 4/1953 | Green .......................... | 33/312 |
| 2,975,384 A | * | 3/1961 | Geiser ......................... | 336/77 |
| 3,299,523 A | * | 1/1967 | Lea ........................... | 33/366.21 |
| 3,786,472 A | * | 1/1974 | Scopacasa .................... | 340/282 |
| 3,984,918 A | * | 10/1976 | Chaney ........................ | 33/366 |
| 4,023,278 A | * | 5/1977 | Hoyt .......................... | 33/377 |
| 4,244,117 A | * | 1/1981 | Cantarella et al. ............ | 33/366 |
| 4,932,132 A | * | 6/1990 | Baker et al. .................. | 33/366 |
| 4,991,301 A | * | 2/1991 | Hore .......................... | 33/366 |
| 5,632,093 A | * | 5/1997 | Elias ......................... | 33/366 |

FOREIGN PATENT DOCUMENTS

| | | | | |
|---|---|---|---|---|
| JP | | 61173111 A | * | 8/1986 |
| JP | | 62177411 A | * | 8/1987 |
| JP | | 02181605 A | * | 7/1990 |

* cited by examiner

Primary Examiner—Christopher W. Fulton
Assistant Examiner—Tania C. Courson

(57) ABSTRACT

Electronic spirit level for measurement of inclination from 0 to 360 degrees. Upon the housing in form of a circular tube, curved in a ring and partially filled with electrically conducting liquid, electrically separated plates of capacitors are placed along the whole length. Because of the difference in relative dielectric constant between air and liquid it can be precisely ascertained, by successive measurements in all condensers, where at the moment the air bubble is placed. The position of the air bubble is recorded in form of a number on a screen. Into a tube along the whole circumference a resistor in the form of a wire is placed which is wound in a spiral shape, where the step of coil is uniformly increasing or multi-layer resistor of the wire, where the cross-section is uniformly changing. By using very thin wires, the resistors are divided in two or several segments. In the tube along the entire circumference of the ring the resistors are placed having a single coil or contact which includes only a part of the winding, being mutually electrically separated and placed at a determined angular degree, the contacts or resistors are each separately connected to the measurement instrument. With successive measurement of resistance or contacts the position of the air bubble can be precisely ascertained.

2 Claims, 2 Drawing Sheets

ELECTRONIC SPIRIT LEVEL FOR MEASUREMENT OF INCLINATION-EXECUTION OF ELECTRIC RESISTORS AND CONDUCTORS

The scope of the invention is an electronic spirit level for measurement of inclination from 0 to 360 degrees and different placements of electrical resistance and conductors within the housing of the electronic level. It is purposed for general use in construction, engineering, households etc. and for special purposes, where high accuracy is required as in laboratories, military equipment etc.

This Invention Solves Two Problems

Problem 1

Measurement of all inclination angles from 0 to 360 degrees should be possible.

Problem 2

In different domains of use a different measurement of inclination is required. What is needed are different types and forms of resistors and conductors, their different placements within the housing and different requirements to reduce the mistakes at measurement.

The Hitherto Known Solutions for the Listed Problems

Known is the following Application of patent dealing and thus: Priority application SI, P-9900196, filed Aug. 13, 1999, and international application PCT/SI 00/ 00018, filed Jul. 26, 2000.

In a circular tube being bent into a round ring and only partially filled with electrically conducting liquid along the entire perimeter a resistor is placed in the form of a wire with an equally varying sectional area. Therefore the resistance of the system depends upon the position of the air bubble. The resistance is measured and calculated into angular degrees and displayed upon the screen. By that the housing can be more or less filled with liquid. On the outer side the coils can be placed tightly one beside the other, where each of the coils is separately connected to the measuring instrument. When the alternating electric voltage is connected upon the wire in the inside, electric voltage in all coils shall be induced. Where the air bubble is placed the induced voltage in the coils is also different. By successive measurements in all coils it can be precisely ascertained where at the moment the air bubble is situated. The air bubble and the inner wire can be substituted by a small metallic ball.

Solving of the Problems 1 and 2.

The measurement of inclination angle is performed with aid of an electronic instrument. Very accurate value is displayed upon the screen in form of digits. The solution is possible in nine manners.

1. The housing formed as a circular tube curved in a circular ring is partially filled with liquid. On the outer side of the housing electrically separated plates of capacitor are placed along the whole length of the round circle. Every capacitor is separately connected to the measuring instrument and placed on the exact angular degree. Because of the difference in relative dielectric constant between air and liquid it can be precisely ascertained, by successive measurements in all capacitors, where at the moment the air bubble is placed. The air bubble can be short or long and the housing can be formed as a circular ring or a circular cylindrical vessel.

2. The housing as a circular tube, curved in a ring is partially filled with electrically conducting liquid. Within the housing, resistance in the form of a wire is placed on the wall of the circular tube In the direction of the tube cross-section. The wire is in a form of one coil. The resistors are placed in defined angular degrees along the whole ring and are mutually electrically separated, having equal electric resistance. Each coil is separately connected to the measuring instrument. If all these resistors are connected to alternate or direct electric voltage, it is possible with consecutive measurement of resistance in all resistors to accurately determine in which resistors the current flows through the electrically conducting liquid and in which it flows through the resistors which are in the air in an air bubble. In this way it can be precisely ascertained where at the moment the air bubble is situated With interpolation of the beginning and the end of the air bubble calculation can be performed exactly, where there is the middle of the air bubble and with it the angle of inclination.

3. The housing as a circular tube, curved in a ring is partially filled with electrically conducting liquid. Within the housing, electrical contact in form of a wire is placed on the wall of the circular tube in the direction of the tube cross section. Electrical contact includes only a part of the circumference of the tube cross-section. The contacts are placed at determined angular degrees along the whole ring and are mutually electrically separated.—Every contact is separately connected to the measuring instrument Electrically conducting liquid can be connected with the source of electric energy with one or more contacts. All the contacts that are tied to the measuring instrument get connected on one pole, where as the electrically conducting spirit gets connected to the other pole. Over the wetted contacts in the electrically conducting liquid current flows over the contact which are in an air bubble or it does not. In this way it can be precisely ascertained where at the moment the air bubble is situated.

4. The housing as a circular tube, curved in a ring is partially filled with electrically conducting liquid. In the housing upon the walls of the tube along the whole circumference a resistor is placed in form of wire, wound in a spiral where the distance between each winding is uniformly increasing. In the entire spiral no two lengths between the windings are the same. The coils are placed in the direction of the tube cross-section. The initial coils are mutually electrically separated. Electric voltage is connected to the spiral and with corresponding instrument the actual resistance of this system can be measured. Through one part of its path the current is flowing through the electrically conducting liquid, but where an air bubble is located it is flowing only through the spiral. Because the number of windings is changing along the length, the resistance of the part of wire being within the air bubble depends upon the place where the air bubble is situated. The value of the entire system of resistance can be accurately measured and displayed upon the screen.

5. The housing as a circular tube, curved in a ring is partially filled with electrically conducting liquid. In the housing along its whole circumference a resistor is placed in form of a wire, wound in spiral, where the distance between each winding is uniformly increasing. In the entire spiral no two lengths between the windings are the same. The spiral is wound upon a round core, which is placed in the axle of the ring.

6. The housing as a circular tube, curved in a ring is partially filled with electrically conducting liquid. Within the housing, along the whole perimeter, resistance in the form of a metal strip is placed on the wall of the circular tube evenly changing its sectional area. The resistor is composed of two or several layers of wires being placed one upon another, so that there is contact between the flat surfaces, where the width is uniformly changing. The thickness of the wire is constant. The strips are mutually electrically separated, so that the flat surfaces in touch are insulated, but lateral edges along the whole thickness are not insulated. So it is enabled that all the layers being wetted are in direct contact with electrically conducting liquid. If on the wires electric voltage is connected the current flows a part of its path through electrically conducting liquid, but where there is an air bubble through each of the wire layers separately.

The housing as a circular tube, curved in a ring or cylindrical vessel is exactly half filled with electrically conducting liquid. There is a resistor within the housing, which is composed of 2 or more round metal strip. The thickness, therefore the cross-area of the wires remains constant. All the metal strips join into one point, which then serves as an electrical contact and is outside the housing. The strips are placed on the periphery of the housing, on the wall of the housing, parallel to each other, and mutually electrically separated. The resistor takes up only ½ of the circumference of the round ring and is divided into 2 or more segments. Each of the segments is separately connected to the voltage and a measuring instrument. If measuring angles which are smaller then 360 degrees the resistor can take up less then ½ of the circumference of the round ring. Small angles require only one segment.

7. The housing as a circular tube, curved in a ring is partially filled with electrically conducting liquid. In the housing on the wall of the tube, along the whole circumference a resistor is placed in the form of a wire, wound in spiral, where the distance between each winding is uniformly increasing. When the diameters of the wire are extremely small, for example smaller than 0.01 mm., because of the large number of coils of spiral the resistance is increasing. The measurement of such big values is difficult The spiral which includes the whole circumference of the ring is divided in two or several mutually separated segments. Each segment is separately connected to the measuring instrument, In this manner high resistance is divided into smaller values.

The housing as a circular tube, curved in round ring is exactly half filled with electrically conducting liquid. In the housing on the wall of the tube, along the whole circumference a resistor is placed in the form of a wire, wound in spiral, where the distance between each winding remains constants The distance between coils is the same. The spiral takes up only ½ of the circumference of the housing. It is divided into 2 or more segments, each of the segments is separately connected to the voltage and a measuring instrument If measuring angles smaller then 360 degrees the spiral can take up less then ½ of the circumference of the housing. For smaller angles only one segment is required.

8. The housing as a circular tube, curved in a ring is partially filled with electrically conducting liquid. The air bubble is short including only some angular degrees. In the housing upon the wall of the tube, along the whole circumference a resistor is placed in the form of a wire wound in spiral, where the distance between each winding is uniformly increasing . In the entire spiral no two lengths between the windings are the same. Between the first and the last coil of the resistor there is an electrically separated resistor which is placed upon the wall of the tube as well and can include one or several coils. Both resistors are separately connected to the measuring instrument. When the position of inclination is such that simultaneously the beginning and the end of the resistor are in the air bubble, the measured value of resistance belongs to entirely different inclinations.

The resistor which is placed between the first and the last coil, is also in the air bubble. Because the resistor is separately connected to the measuring instrument it can be precisely ascertained which measured resistance belongs to which inclination.

9. The housing as a circular tube, curved in a ring is partially filled with electrically conducting liquid. In the housing upon the wall of tube the electrical conductors are placed along whole circumference. They are composed of several layers of flat metal strip being put upon each other. The strips are mutually electrically separated so that the flat surfaces which are touching each other are insulated, but the edges are not The conductors are placed along the whole perimeter of the tube cross-section and are electrically separated. The conductors have equal sectional area along its whole length. The whole circle is covered with coils, being placed close one to the other or even partially covering each other. The coil is placed so that the axle of a coil is perpendicular to the tangent of the wire.

An advantage of all cited solutions is, besides of the accurate measurement and reading, not depending on the visual ability of the user in this that they enable the measurements of inclination from 0 to 360 degrees.

The accuracy of the measurement depends on the making of the housing, resistors respectively conductors and of the quality of the liquid. For accurate measurement the inside of the housing must be as smooth as possible. The resistors which are tightly adapted to the wall of the housing must be as thin as possible, so that they influence the smoothness of the surface less and that it enables as dense as possible winding of the spiral respectively with multi-layer resistors bigger change of resistance with the change of the cross-section. The liquid must be optimally electrically conductive, optimally viscous so that it can as good as possible glide along the housing and resistor and that it reacts well to the smallest change of inclination and that it has optimal capillary wetting ability diminished also when the air bubble in housing is under increased pressure. By some executions a thermal sensor is required, which is a connection to the measurement instrument. Measurement instrument considers the changes at measurement which are a consequence of thermal dilatation.

Designing Solutions

The designing solutions are shown upon nine cases of execution.

Figure 1:
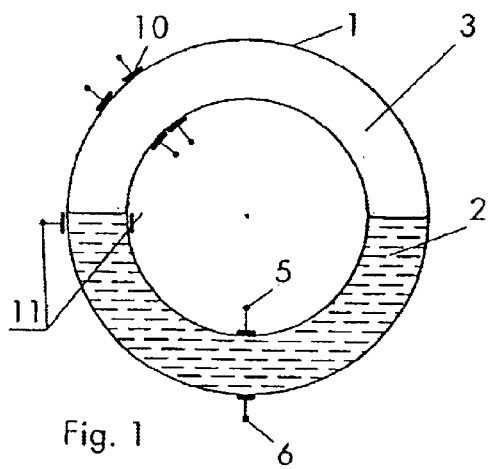
FIG. 1 is a front view of one embodiment of the measurement device of the present invention.

The Execution Case No. 1 is Shown Upon the FIG. 1

The housing (1) as a circular tube, curved in a ring is partially filled with liquid (2). On the outer side upon the housing (1) the plates of capacitor (10) are placed along the whole round circle and are electrically separated. Each capacitor (11) is separately connected to the measuring instrument Because of the difference in relative dielectric constant between the air bubble (3) and liquid (2) it can be precisely ascertained, by successive measurements in all condensers, where at the moment the air bubble is placed. The terminals or the wire (5,6) are connected to the voltage and measuring instrument.

Figure 2:
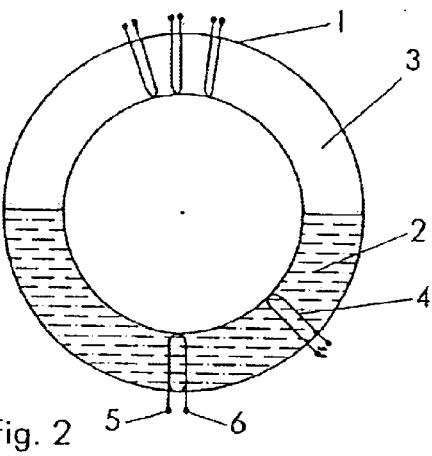
FIG. 2 is a front view of one embodiment of the measurement device of the present invention.

The Execution Case No. 2 is Shown Upon the FIG. 2

The housing (1) as a circular tube, curved in a ring is partially filled with electrically conducting liquid (2). Within the housing (1), resistance in the form of a wire (4) is placed on the wall of the circular tube in the direction of the tube cross-section. The resistors (4) are placed upon determined angular degrees along the whole ring and they are mutually electrically separated and have equal electrical resistance. Each coil is separately connected to the measuring instrument. If all the resistance (4) is connected to the alternating or one-way voltage, it can be precisely ascertained, by successive measurements of the resistance in all resistors, where at the moment the air bubble (3) is placed, The terminals or the wire (5,6) are connected to the voltage and measuring instrument.

Figure 3:
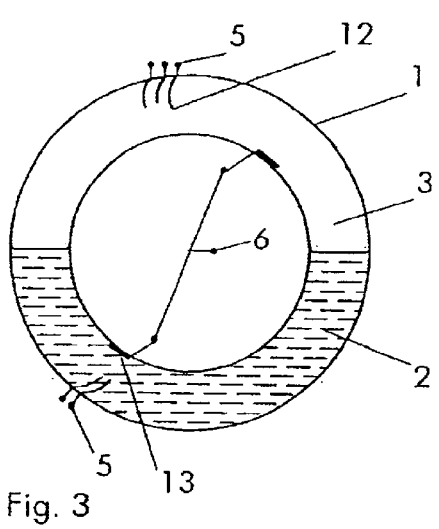
FIG. 3 is a front view of one embodiment of the measurement device of the present invention.

The Execution Case No. 3 is Shown Upon the FIG. 3

The housing (1) as a circular tube, curved in a ring is partially filled with electrically conducting liquid (2). Within the housing (1), electrical contact in the form of a wire (12) is placed on the wall of the circular tube in the direction of the tube cross-section. Electrical contact (12) covers only a part of the circumference of the tube cross-section The contacts (12) are placed at determined angular degrees along the whole ring and are mutually electrically separated. Every electrical contact is separately connected to the measuring instrument. Electrically conducting liquid (2) is connected to the source of electric energy with one or more contacts (13) and one of the contacts (13) is always in direct contact with liquid (2). Contacts (13) are tightly attached to the wall of the tube. All the contacts (12) are connected to the measuring instrument All the contacts (12), connected to the measuring instrument, are now connected to one electrical pole, electrically conductive spirit (2) along with the contact (13) is connected to the other electrical pole. Over the contact (12) being wetted in electrically conducting liquid, the current is flowing and through the contacts (12) in the air bubble (3) the current does not flow. In this way the beginning and the end of the air bubble (3) can be precisely ascertained. The terminals of the wire (5,6) are connected to the voltage and measuring instrument.

Figure 4:
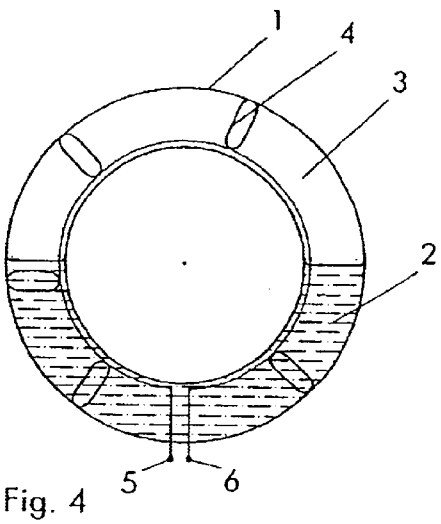
FIG. 4 is a front view of one embodiment of the measurement device of the present invention.

The Execution Case No. 4 is Shown Upon the FIG. 4

Figure 5:
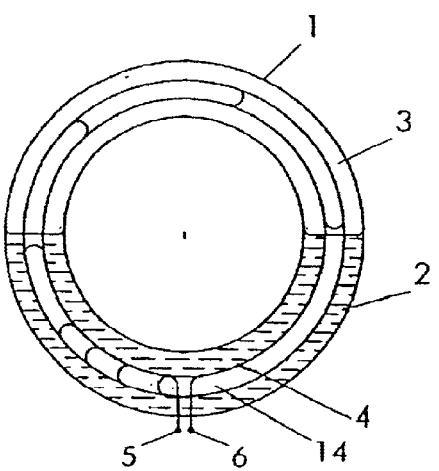
FIG. 5 is a front view of one embodiment of the measurement device of the present invention.

The housing (1) as a circular tube, curved in a ring is partially filled with electrically conducting liquid (2). In the housing (1) upon the entire circumference the resistance is placed in the form of a wire (4) wound in spiral of which the distance between each winding is uniformly increasing. In the entire spiral no two lengths between the windings are the same. The coils are placed in the direction of the tube cross-section. The first two coils are electrically separated. If the spiral (4) is connected to the voltage, the current travels a part of its path through the electrically conducting liquid (2), but where an air bubble (3) is located the current flows only through the spiral. The value of the entire system resistance can be accurately measured and displayed upon the screen. The terminals or the wire (5,6) are connected to the voltage and measuring instrument The Execution Case No. 5 is Shown Upon the FIG. 5

The housing (1) as a circular tube, curved in a ring is partially filled with electrically conducting liquid (2). In the housing (1) upon the entire circumference the resistance is placed in the form of a wire (4) wound in spiral of which the distance between each winding is uniformly increasing. In the entire spiral no two lengths between the windings are the same. The spiral is wound upon a round core (14), which is placed in circumferential axis of the ring. The voltage terminals of the wire (5,6) and are within the vicinity of the air bubble (3).

Figure 6:
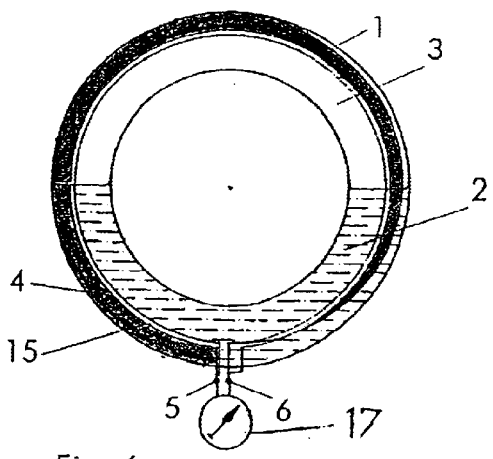
FIG. 6 is a front view of one embodiment of the measurement device of the present invention.

The Execution Case No. 6 is Shown Upon the FIG. 6

The housing (1) as a circular tube, curved in a ring is partially filled with electrically conducting liquid (2). Within the housing (1), along the whole perimeter, resistance in the form of a metal strip (4) is placed on the wall of the circular tube evenly changing its sectional area. The resistance (4) is composed of two or several layers of wire being put one upon each other, so that they are in touch with flat surface where the width is uniformly changing. The thickness of the strip is constant The strips are partially electrically separated, so that the joining flat surfaces are insulated and the lateral edges along the whole thickness (15) are not insulated and are in direct contact with the liquid. If upon the strips electrical voltage is connected, the current is flowing a part of its path through electrically conducting liquid, where there is an air bubble (3) along each layer of the strip separately. The voltage terminals of the strip are (5,6).

The housing (1) as a circular tube, curved in a ring or cylindrical vessel is exactly half filled with electrically conducting liquid (2). There is a resistor (4) within the housing (1), which is composed of 2 or more round wires. The thickness, therefore the cross-area of the wires remains constant. All the wires join into one point, which then serves as an electrical contact (5,6) and is outside the housing (1). The wires (4) are placed on the periphery of the housing (1), on the wall of the housing, parallel to each other, and mutually electrically separated. The resistor (4) takes up only ½ of the circumference of the housing (1) and is divided into 2 or more segments. Each of the segments is separately connected to the voltage and a measuring instrument (17). The terminals of the resistor (4) are represented by (5,6).

Figure 7:
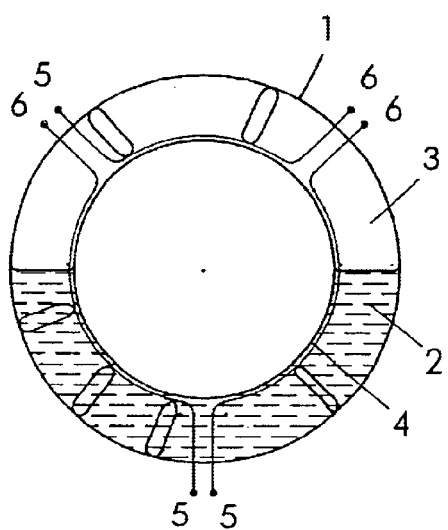
FIG. 7 is a front view of one embodiment of the measurement device of the present invention.

The Execution Case No. 7 is Shown Upon the FIG. 7

The housing (1) as a circular tube, curved in a ring is partially filled with electrically conducting liquid (2). In the housing (1) is upon the wall of tube along the whole circumference a resistor is placed in the form of a wire (4), wound in spiral, where the distance between each winding is uniformly increasing. The spiral (4), which includes the whole circumference of the ring is divided in two or several mutually electrically separated segments. Each segment is separately connected on the measuring instrument. The voltage terminals or the wire are (5,6) and air bubble (3).

The housing (1) formed in from of a circular tube, curved in round ring is exactly half filled with electrically conducting liquid (2). In the housing (1) on the wall of the tube, along the whole circumference a resistor (4) is placed in form of wire, wound in spiral, where the distance between each winding remains constant. The distance between coils is the same. The spiral (4) takes up only ½ of the circumference of the housing (1). The resistor (4) is divided into 1, 2 or more segments. Each of the segments is separately connected to the voltage and a measuring instrument. The electrical terminals are represented by (5,6).

Figure 8:
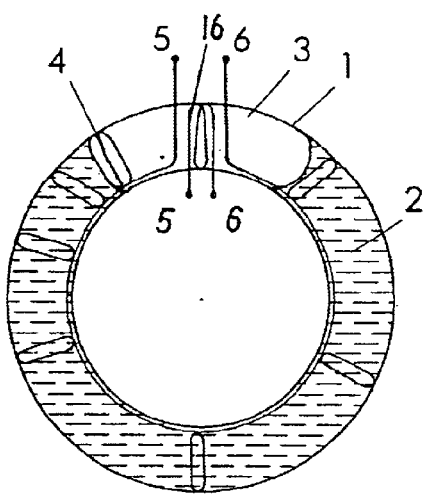
FIG. 8 is a front view of one embodiment of the measurement device of the present invention.

The Execution Case No. 8 is Shown Upon the FIG. 8

The housing (1) as a circular tube, curved in a ring is partially filled with electrically conducting liquid (2). The air bubble (3) is short including only some angular degrees. In the housing (1) upon the wall of tube along whole circumference a resistor is placed in the form of a wire (4), wound in spiral where the distance between each winding is uniformly increased. Between the first and the last winding of the resistor (4) an electrically separated resistor (16) is placed which is also placed upon the wall of the tube and can include one or several coils. Both resistors (4, 16) are separately connected to the measuring instrument When the position of inclination is such that both, the beginning and the end of the resistor, are situated in the air bubble (3), two entirely different inclinations belong to the measured value.

Resistor (16) is also in the air bubble (3). Because the resistor is separately connected to the measuring instrument it can be precisely ascertained which measured resistance belongs to which inclination. The terminals or the wire (5.6) are connected to the voltage and measuring instrument.

Figure 9:
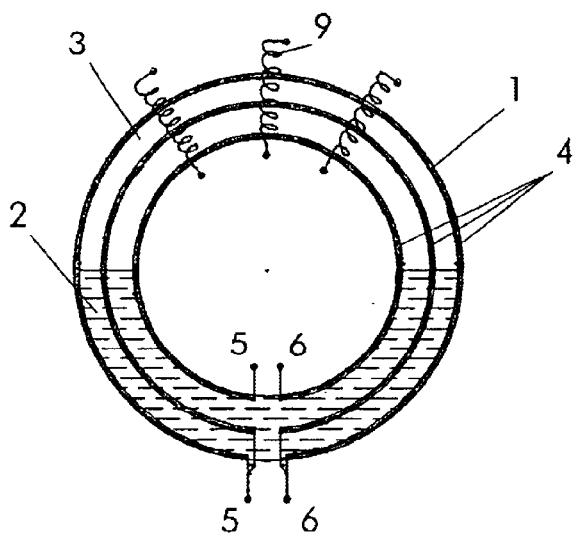
FIG. 9 is a front view of one embodiment of the measurement device of the present invention.

The Execution Case No. 9 is Shown Upon the FIG. 9

The housing (1) as a circular tube, curved in a ring is partially filled with electrically conducting liquid (2). In the housing (1) upon the wall of the tube along the whole perimeter electric conductors (4) are placed, composed of several layers of metal strips being put one upon another. The strips are partially separated so that the joining surfaces are insulated, and side edges along the whole length are not insulated The conductors (4) are placed along the whole perimeter of the sectional area of the tube and are electrically separated. The conductors have equal sectional area along its whole length. The whole circle is covered with coils (9), being placed close one to the other or even partially covering each other. The coil (9) is placed so that the axle of a coil is perpendicular to the tangent of the conductor (4). The voltage terminals of the wire (5,6) and are within the vicinity of the air bubble (3).

What is claimed is:

1. An electrically non-conductive housing (1) of an electronic spirit level formed of a round tube bent in a round ring is partially or exactly ½ filled with electrically conducting liquid (2), characterized with it, that in the housing (1) upon the wall of the tube along the whole circumference are placed two or several layers of metal strip (4) where the cross-section uniformly changes, the layers of metal strip (4) are put one upon the other so that in the contact of flat surface where the width is uniformly changing, that the thickness of metal strip (4) is constant, the layers of metal strip (4) are partially electrically separated so that the joining flat surfaces are insulated, lateral edges of the whole thickness (15) are not insulated and are in direct contact with liquid (2) and the terminal (5), (6) for voltage and a measuring instrument (17), are outside of the housing (1).

2. The housing of an electronic spirit level according to claim 1, characterized with it, that in the housing (1) upon the wall of the tube along the whole circumference, the metal strip (4) is placed and the whole circle along the tube is divided in two or several equally electrically separated segments and each segment has terminals (5), (6) for voltage and the measuring instrument (17).

* * * * *